US007710694B2

(12) United States Patent
Asano et al.

(10) Patent No.: US 7,710,694 B2
(45) Date of Patent: May 4, 2010

(54) EARTH LEAKAGE BREAKER

(75) Inventors: Hisanobu Asano, Kounosu Saitama (JP); Yasuhiro Takahashi, Tochigi (JP)

(73) Assignee: Fuji Electric FA Components and Systems Co., Ltd., Tokyo (JP)

( * ) Notice: Subject to any disclaimer, the term of this patent is extended or adjusted under 35 U.S.C. 154(b) by 123 days.

(21) Appl. No.: 11/727,456

(22) Filed: Mar. 27, 2007

(65) Prior Publication Data

US 2007/0236841 A1 Oct. 11, 2007

(30) Foreign Application Priority Data

Apr. 7, 2006 (JP) ............................ 2006-105830
Oct. 17, 2006 (JP) ............................ 2006-282096

(51) Int. Cl.
*H02H 3/00* (2006.01)

(52) U.S. Cl. ........................................................ 361/42

(58) Field of Classification Search .................. 361/42, 361/331, 364, 381; 335/18, 35; 200/310
See application file for complete search history.

(56) References Cited

U.S. PATENT DOCUMENTS 5,757,254 A * 5/1998 Kurono et al. ................ 335/35
5,956,218 A * 9/1999 Berthold ...................... 361/42
6,784,770 B2 * 8/2004 Gimenez et al. .............. 335/18
6,864,447 B1 * 3/2005 Lipsey et al. ................ 200/310
6,882,257 B2 * 4/2005 Anamura et al. .............. 361/42
2004/0233594 A1 * 11/2004 Asano et al. .................. 361/42

FOREIGN PATENT DOCUMENTS

JP H06-236726 8/1994
JP H09-063453 3/1997

* cited by examiner

*Primary Examiner*—Jared J Fureman
*Assistant Examiner*—Angela Brooks
(74) *Attorney, Agent, or Firm*—Manabu Kanesaka

(57) ABSTRACT

An earth leakage breaker includes a main body housing having, in a single structure, a casing and a case cover, and an auxiliary cover for covering the case cover. The case cover has a recess for mounting an internal accessory device. Components including a main circuit contact, a contact switching mechanism, an operation handle, an overcurrent tripping device, an earth leakage detection circuit combined with a zero-phase current transformer, and an earth leakage tripping device, are retained in the main body housing. An earth leakage operation output switch is detachably mounted in the recess formed in the case cover of the main body housing. The earth leakage operation output switch is an internal accessory device that indicates earth leakage trip operation electrically and linking mechanically with the earth leakage trip device to operate the earth leakage operation output switch in the earth leakage trip operation.

3 Claims, 9 Drawing Sheets

Fig. 4(a)
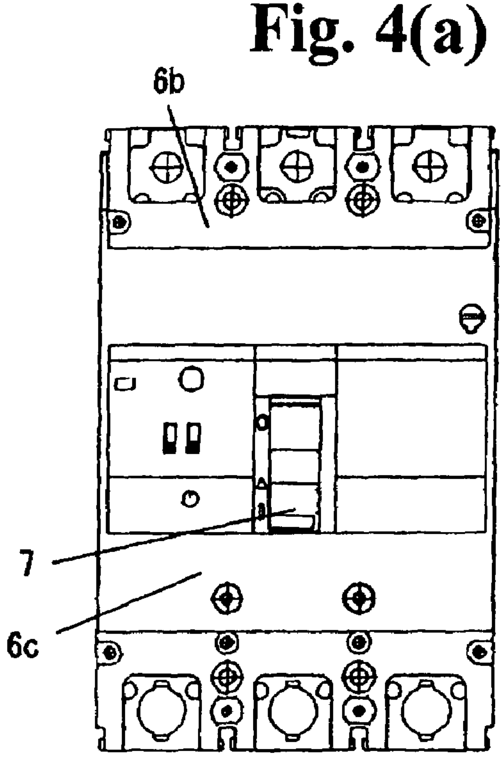
Fig. 4(b)
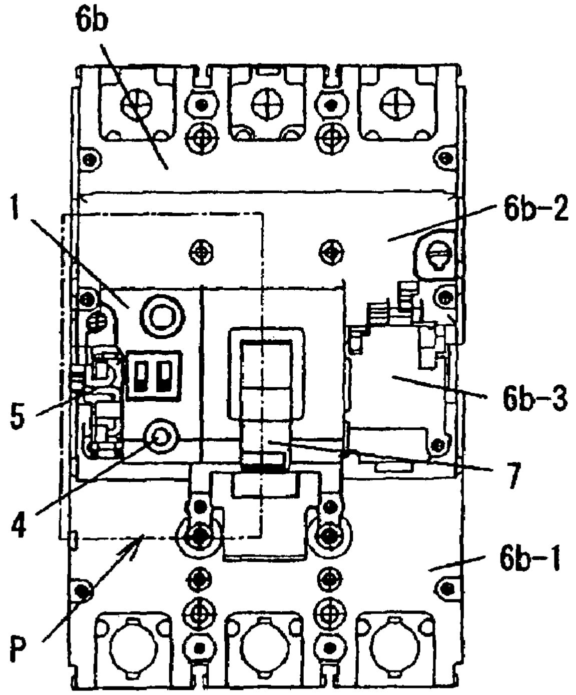
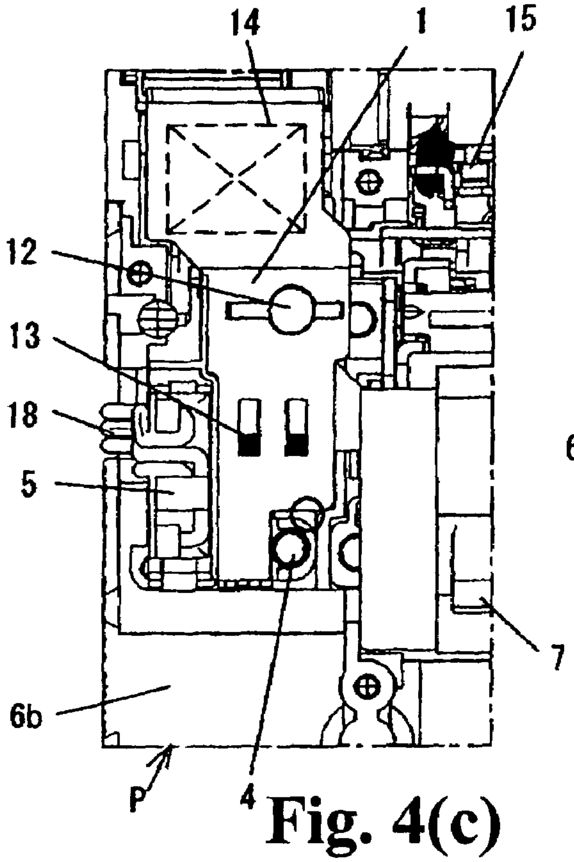
Fig. 4(c)
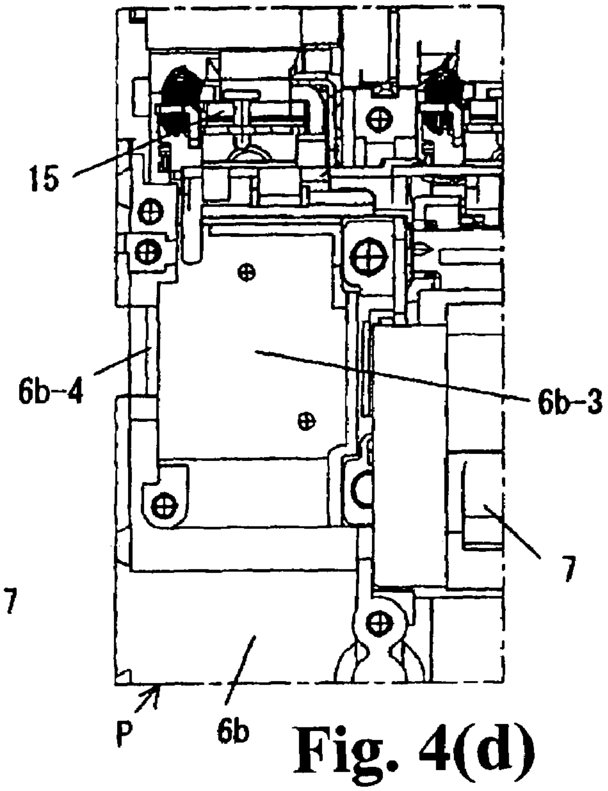
Fig. 4(d)

Fig. 11(a)
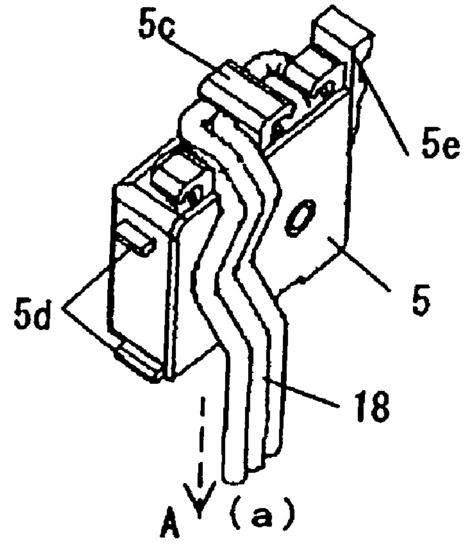
Fig. 11(b)
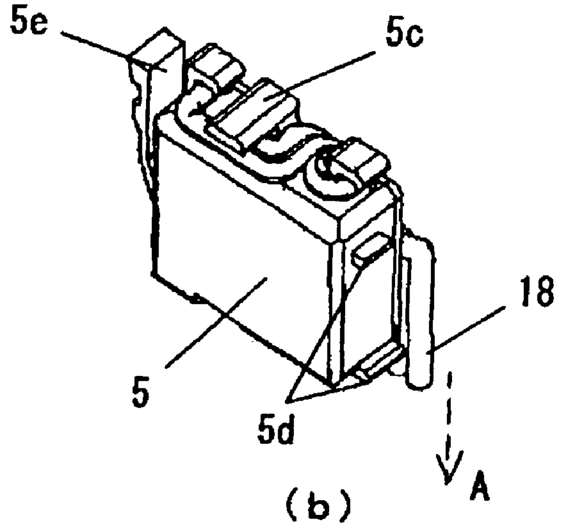
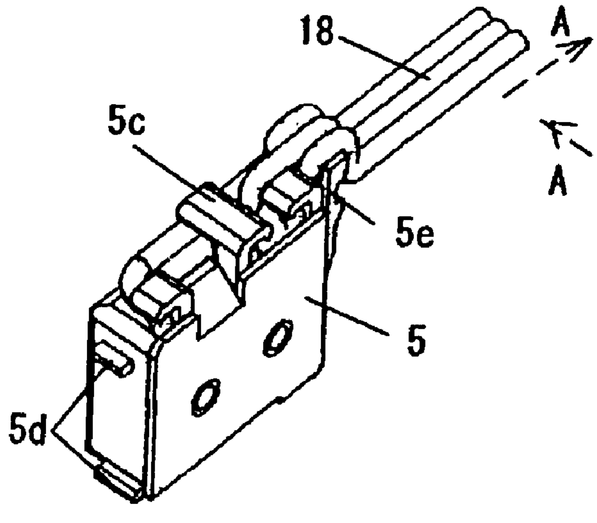
Fig. 12(a)
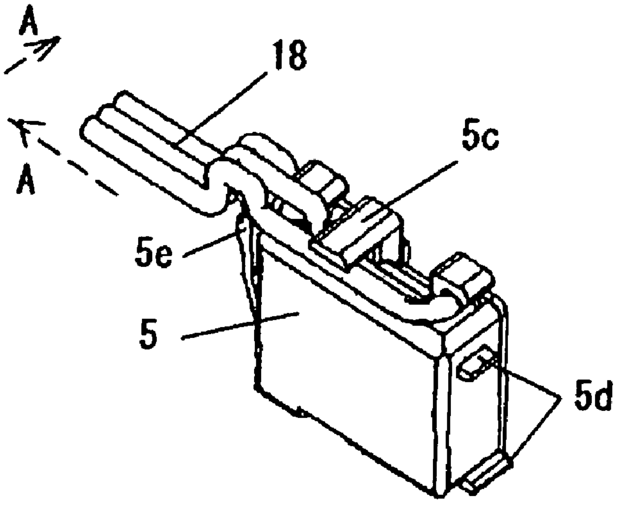
Fig. 12(b)

Fig. 15
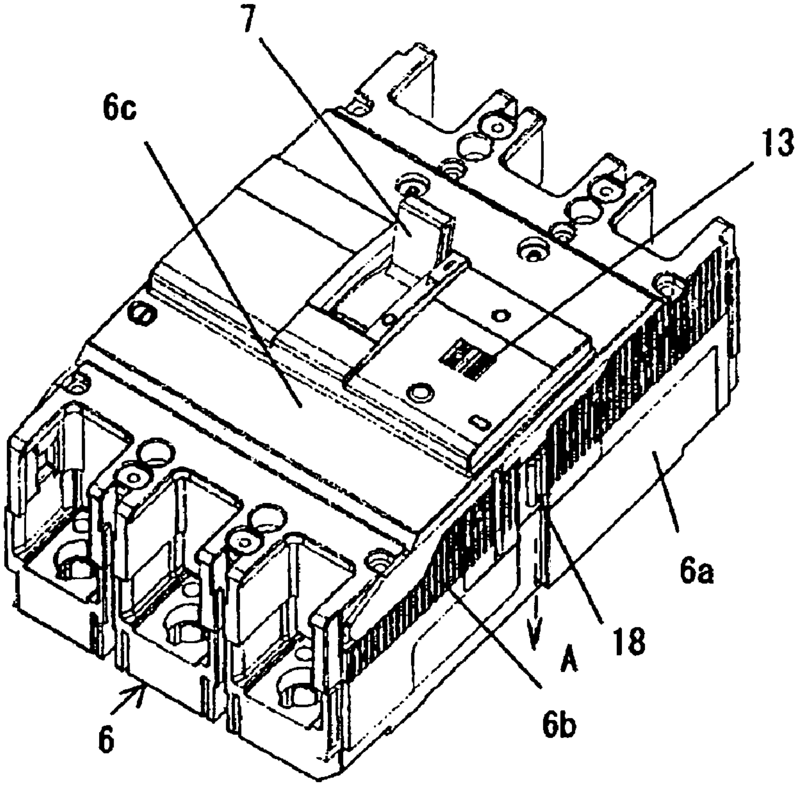
Fig. 16(a) Prior Art
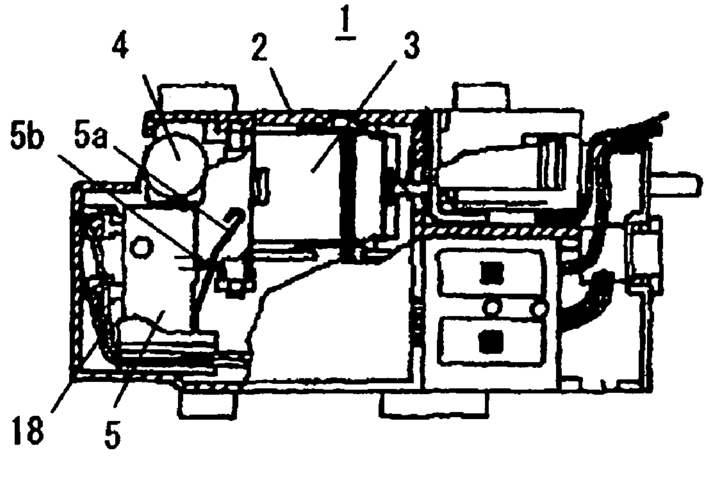
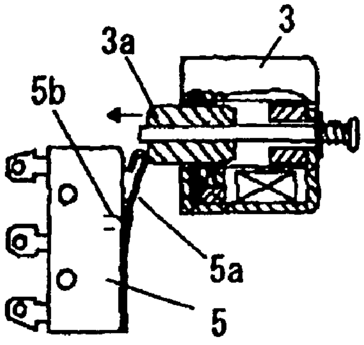
Fig. 16(b) Prior Art

EARTH LEAKAGE BREAKER

BACKGROUND OF THE INVENTION AND RELATED ART STATEMENT

The present invention relates to an earth leakage breaker with overcurrent protection and ground fault protection functions in a low voltage distribution system. In particular, the invention relates to a structure for posterior mounting type earth leakage operation output switch, as an internal accessory device of an earth leakage breaker that electrically indicates an earth leakage trip operation of the earth leakage breaker.

Known protection devices in a low voltage distribution system include a molded case circuit breaker and an earth leakage breaker. An earth leakage breaker produced in these days in Japan generally has an integrated structure assembling the parts for overcurrent protection function and the parts for ground fault protection function together in a single main body housing that has the same external dimensions as those of the molded case circuit breaker.

Circuit breakers such as molded case circuit breakers and earth leakage breakers have various internal accessory devices including an auxiliary switch for electrical indication of ON, OFF states of a breaker, an alarm switch for indicating trip state, a voltage trip device and the like as optional devices in order to flexibly deal with a system change in the user side. The internal accessory devices can be installed to be taken out afterwards in a recess formed in a cover of a main body housing (for example, Patent Document 1).

Conventional earth leakage breakers are normally equipped with an earth leakage indicating button of a pop-up type as a means for indicating the earth leakage trip operation (the indicator button projects from the cover of the main body housing in the earth leakage trip operation). Different from this means, an earth leakage operation output switch (a micro switch) for electrically indicating the earth leakage trip operation is installed in a known earth leakage trip device (for example, Patent Document 2). FIGS. 16(*a*) and 16(*b*) show an assembly structure of the prior art.

Referring to FIGS. 16(*a*) and 16(*b*), the reference numeral 1 designates an earth leakage trip device mounted on a main body housing of the breaker. The earth leakage trip device has a structure wherein the essential components including a trip coil 3 (a plunger type electromagnet in combination of a retaining magnet and a driving spring), an earth leakage indicating button 4, and an earth leakage operation output switch 5 responding to earth leakage trip operation are permanently installed in a unit case 2 (a molded resin casing).

The earth leakage operation output switch 5 employs a micro switch with its actuator lever 5*a* arranged opposing a movable iron core 3*a* of the trip coil 3 in the unit case 2. The movable iron core 3*a* of the trip coil 3 is driven in the direction of the arrow on receiving an earth leakage detection signal from an earth leakage detection circuit. Corresponding to the movement of the movable iron core 3*a*, an actuating slider (not shown in the figures) strikes a trip crossbar of the breaker to trip a contact switching mechanism, and at the same time, the movable iron core 3*a* pushes an actuator lever 5*a* of the micro switch towards inside of the micro switch. As a result, a contact (a "make" contact) of the earth leakage operation output switch 5 turns ON to output an earth leakage operation signal. In FIGS. 16(*a*) and 16(*b*), the reference numeral 5*b* designates a plunger that transmits the movement of the actuator lever 5*a* to a movable contact of the micro switch.

Patent Document 1: Japanese Unexamined Patent Application Publication No. H6-236726 (U.S. Pat. No. 5,581,219) (FIG. 1-3)

Patent Document 2: Japanese Unexamined Patent Application Publication No. H9-63453 (FIGS. 1-3)

Earth leakage breakers mounting the earth leakage trip device having the conventional structure as described above have following problems from a viewpoint of a user side. In the conventional structure shown in FIGS. 16(*a*) and 16(*b*), the earth leakage operation output switch 5 is fixedly installed in the casing of the earth leakage trip device 1 and engaged with the movable ion core 3*a* of the trip coil 3, and the earth leakage breaker equipped with the earth leakage trip device 1 is shipped as a product incorporating the earth leakage operation output switch 5 at the time of shipment.

For the users without using electrical indication of the earth leakage operation in the system employing an earth leakage breaker, the earth leakage operation output switch permanently incorporated in the earth leakage breaker deserves an excess specification. On the contrary, the users that purchased an earth leakage breaker with standard specification that is not equipped with an earth leakage operation output switch, cannot add an earth leakage operation output switch to the earth leakage breaker as it is. Consequently, these users can make a system including electrical indication of the earth leakage operation only by asking the manufacturer to exchange the earth leakage trip device for the one equipped with an earth leakage operation output switch, or by newly purchasing another earth leakage breaker with an earth leakage operation output switch. This is hardly dealt with by the users.

In light of the above problems, it is an object of the present invention to provide an earth leakage breaker capable of indicating earth leakage operation by an electric signal, wherein a user can install later an earth leakage operation output switch as an optional internal accessory device similar to an auxiliary switch and an alarm switch, onto an earth leakage breaker of standard specification. The invention also provides a structure for mounting an earth leakage operation output switch afterwards.

Further objects and advantages of the invention will be apparent from the following description of the invention.

SUMMARY OF THE INVENTION

The foregoing object of the invention has been achieved by an earth leakage breaker that serves functions of overcurrent protection and ground fault protection, and comprises a main body housing of a simplex structure composed of a casing and a case cover, the case cover being combined with an auxiliary cover that covers the case cover and having a recess with a pocket shape for mounting internal accessory devices.

The circuit breaker contains components in the housing, the components including a main circuit contact, a contact switching mechanism, an operation handle, an overcurrent tripping device, an earth leakage detection circuit combined with a zero-phase current transformer, and an earth leakage tripping device. An earth leakage operation output switch is removable and allowed to be mounted in the recess formed in the case cover of the main body housing. The earth leakage operation output switch is an internal accessory device that indicates earth leakage trip operation electrically and links mechanically with the earth leakage trip device to operate the earth leakage operation output switch in the earth leakage trip operation (first aspect). More specifically, the earth leakage breaker of the invention is constituted by the following modes.

(1) The earth leakage trip device mounted on the main body housing has a unit case including a switch housing for holding the earth leakage operation output switch, and the switch housing is disposed facing the recess of the case cover of the main body housing (second aspect).

(2) The earth leakage operation output switch is a micro switch, and an actuator of the micro switch is linked to an output end of the earth leakage trip device at a position of the micro switch inserted into the recess of the case cover of the main body housing (third aspect).

(3) The lead wires connected to the earth leakage operation output switch is placed to pass through a gap between the case cover of the main body housing and an auxiliary cover covering the case cover, and is lead out towards outer side or upper direction for wiring (fourth aspect).

(4) The earth leakage operation output switch in the mode (3) above has a support member for the lead wires on a top of the switch, and the lead wires are entangled with the support member to be tightly bundled, lead out outwardly of the housing through the gap adjacent to the auxiliary cover for wiring (fifth aspect).

(5) The lead wires, in the mode (3) above, connected to the earth leakage operation output switch and leading out towards outwardly of the main body housing is pushed down and held by an edge of the auxiliary cover covering the case cover of the main body housing at an intermediate position of the lead wires running outwardly (sixth aspect).

In this structure, the earth leakage operation output switch (an optional device), similarly to the internal accessory device such as an auxiliary switch and an alarm switch installed later for usage in an earth leakage breaker, can be readily inserted and set in the form of a cassette into a recess formed in the case cover of the main body housing by a user. At this inserted position, the earth leakage operation output switch is linked with the earth leakage tripping device to electrically indicate the earth leakage operation. Posterior installation of the earth leakage operation output switch can be readily conducted to electrically indicate earth leakage trip operation, which has been hardly dealt with by the user side in the conventional products. Therefore, service ability for the use is improved.

The unit case of the earth leakage trip device installed in the earth leakage breaker has a monolithically formed switch housing with a pocket shape for engaging and holding the earth leakage operation output switch at a predetermined insertion position. In this constitution, the earth leakage operation output switch and the earth leakage trip device working together, ensure linkage between the two and switching operation. In addition, the earth leakage operation output switch can be inserted and held at the predetermined position without limitation of configuration of the recess formed on the case cover of the main body housing of the breaker. Therefore, the configuration and structure of the recess formed on the case cover of the housing can be simplified.

Further by employing the wiring methods of the fourth through sixth aspects for the lead wires of the post mounted earth leakage operation output switch, the lead wires connected to the earth leakage output switch can be lead out for wiring in a desired direction corresponding to the condition of the application site in the user side. In addition, when the lead wires are entangled with the support member for the lead wires formed on a top of the switch housing and tightly bundled, and further pushed down and held by an edge of the auxiliary cover covering the case cover of the main body housing at an intermediate position of the lead wires, the lead wires extending outwardly, even exerted by an external tensional force, do not accidentally come off from the earth leakage operation output switch or the switch does not slip out of the predetermined place. Therefore, high reliability is secured.

BRIEF DESCRIPTION OF THE DRAWINGS

FIG. 4(*a*) through FIG. 4(*d*) are supplementary illustrations showing arrangement of an earth leakage tripping device and an earth leakage operation output switch mounted on the earth leakage breaker, wherein FIG. 4(*a*) is a plan view of the whole breaker with a top cover, FIG. 4(*b*) is a plan view without a top cover, FIG. 4(*c*) is an enlarged plan view of a region "P" in FIG. 4(*b*), and FIG. 4(*d*) is an enlarged plan view of the region "P" in which the earth leakage trip device and the earth leakage operation output switch are removed from the configuration in FIG. 4(*c*) to empty the recess of the case cover;

FIG. 11(*a*) and FIG. 11(*b*) are perspective views illustrating the earth leakage operation output switch with the lead wires entangled with the support member and lead out sidewardly, in which FIG. 11(*a*) is seen from the front side, and FIG. 11(*b*) is seen from the rear side;

FIG. 12(*a*) and FIG. 12(*b*) are perspective views illustrating the earth leakage operation output switch with the lead wires entangled with the support member and lead out forwardly, in which FIG. 12(*a*) is seen from the front side, and FIG. 12(*b*) is seen from the rear side;

FIG. 15 is a perspective view illustrating a configuration with the top cover (auxiliary cover) covering the case cover of the main body housing of FIG. 13; and FIG. 16(*a*) and FIG. 16(*b*) illustrate a conventional earth leakage tripping device having an earth leakage operation output switch installed in an earth leakage breaker, in which FIG. 16(*a*) is a plan view of a partial cross section, FIG. 16(*b*) is a plan view of a structure of an essential parts of FIG. 16(*a*).

DETAILED DESCRIPTION OF PREFERRED EMBODIMENTS

Figure 9:
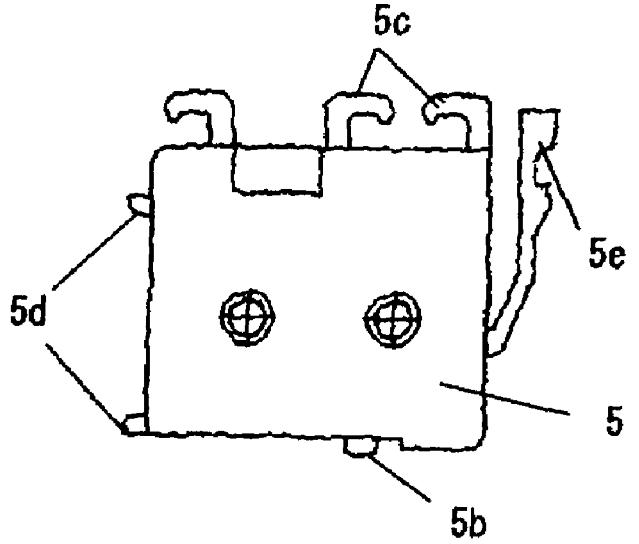
FIG. 9 is a front view of the earth leakage operation output switch.
Figure 10A:
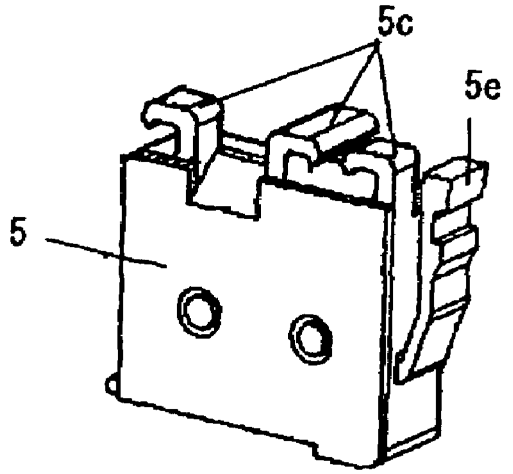
FIG. 10(*a*) and FIG. 10(*b*) are perspective views of FIG. 9, in which FIG. 10(*a*) is seen from the front side and FIG. 10(*b*) is seen from the rear side.
Figure 10B:
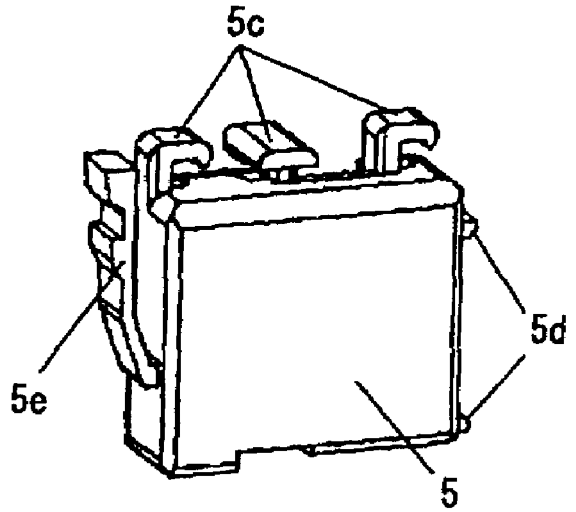

Some preferred embodiments according to the invention will be described with reference to FIGS. 1 through 15. FIG. 1 through FIG. 4(*d*) show a structure of an earth leakage breaker mounting an earth leakage operation output switch; FIG. 5 through FIG. 8 show a structure of an earth leakage trip device mounted on an earth leakage breaker; FIG. 9 to FIG. 10(*b*) show a structure of an earth leakage operation output switch; and FIG. 11(*a*) through FIG. 15 show lead out and wiring structure of lead wires connected to the earth leakage operation output switch.

Figure 1:
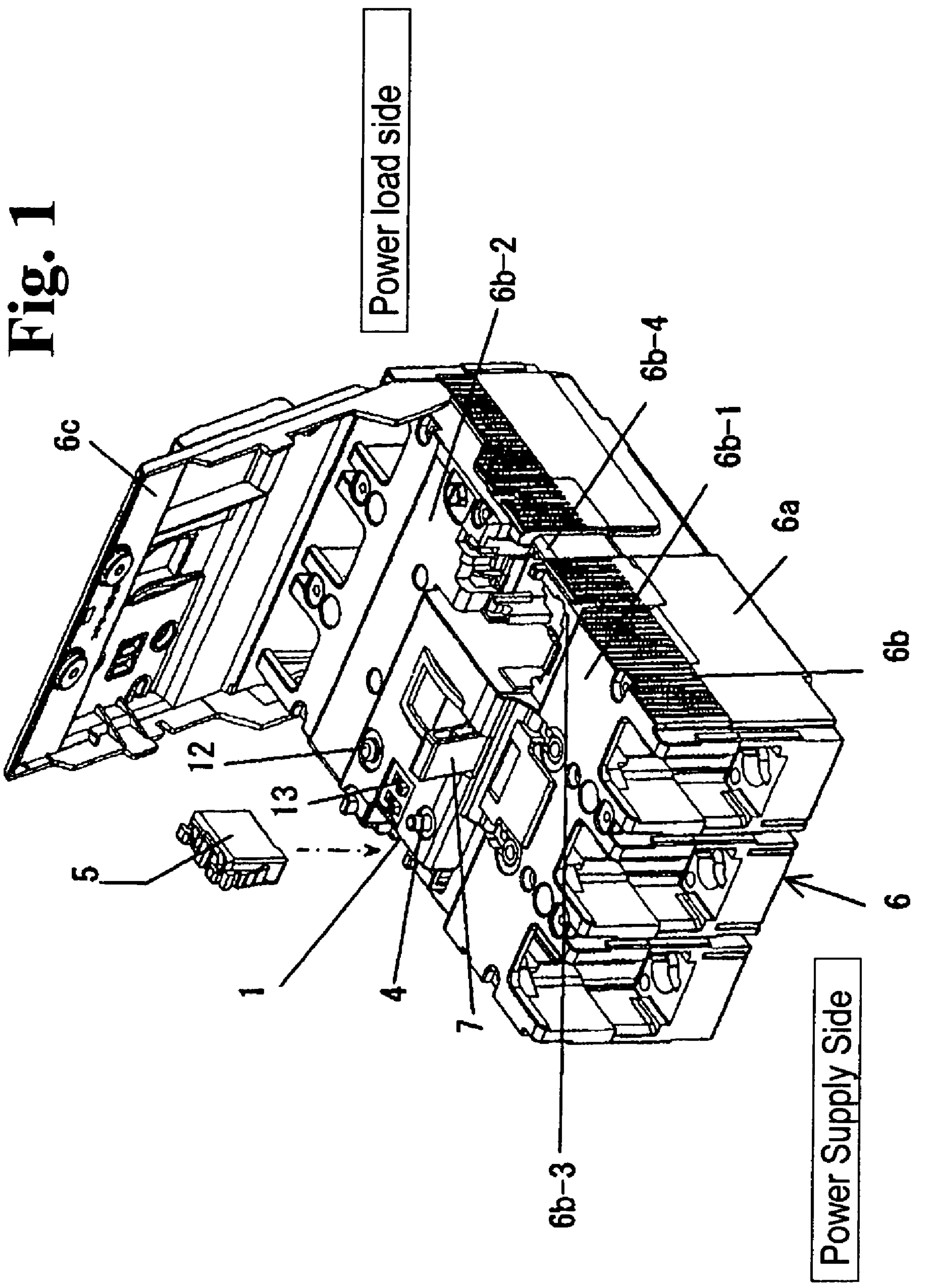
FIG. 1 is a perspective view of an earth leakage breaker.
Figure 2:
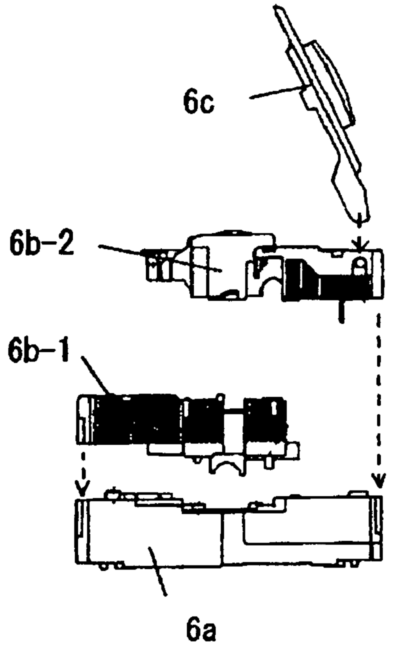
FIG. 2 is a disassembled side view of a main body housing of the breaker of FIG. 1.
Figure 3:
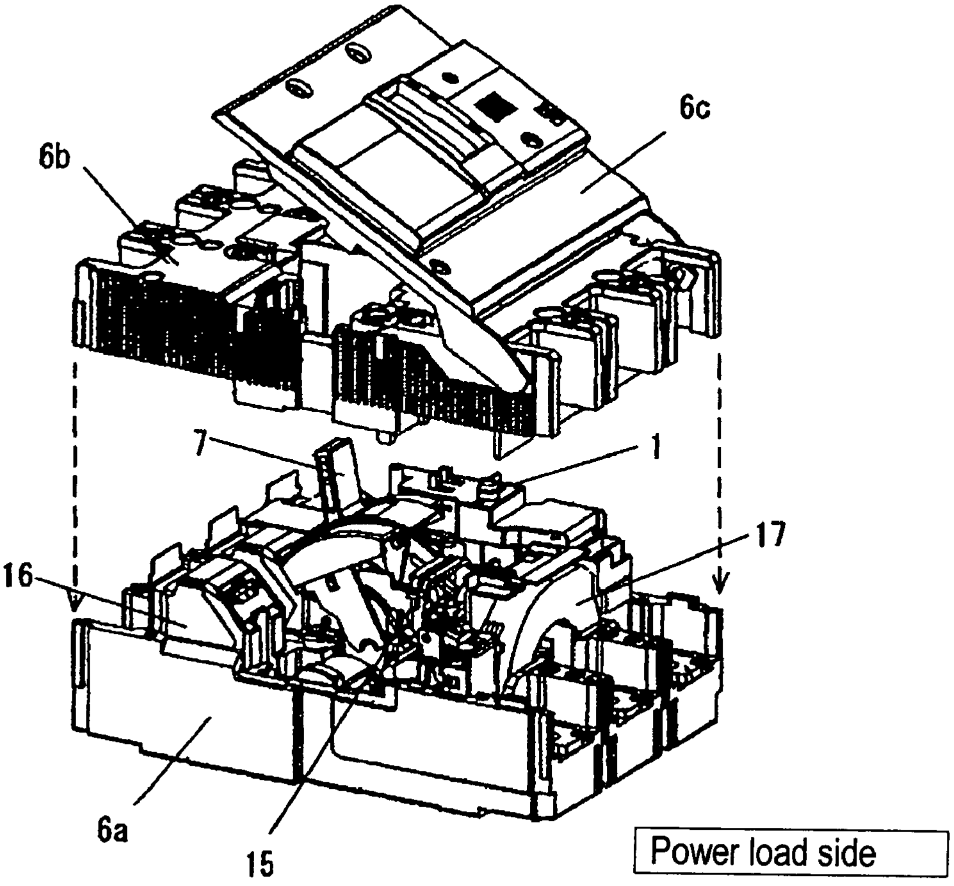
FIG. 3 is a perspective view showing the internal structure of the breaker with the main body housing disassembled.

Referring to FIG. 1 through FIG. 3, a main body housing 6 of an earth leakage breaker has a structure divided into a case 6*a*, a case cover 6*b*, and a top cover (auxiliary cover) 6*c* made of molded resin. The case cover 6*b* in the figures is divided into a cover division 6*b*-1 covering a supply side area of the main body housing 6 and a cover division 6*b*-2 covering a load side area (FIG. 2). The top cover 6*c* is attached for allowing opening and closing. One end of the top cover 6*c* is combined with the cover division 6*b*-2 by a hinged coupling, and the other end of the top cover 6*c* is combined with the upper surface of the cover division 6*b*-1 by a screw coupling.

Installed in the case 6*a* are a switching operation handle 7, a switching mechanism 15, an arc extinguishing chamber 16, a zero phase current transformer 17, and an earth leakage trip device 1 in the side of the handle 7 (FIG. 3). The case cover 6*b* covering the case 6*a* has a recess 6*b*-3 with a pocket configuration in the both sides of the operation handle 7 for accommodating various internal accessory devices including an earth leakage operation output switch 5 that is mounted on the earth leakage trip device 1 afterwards, an auxiliary switch, an alarm switch and the like. The case 6*a* and the accessories are covered by the top cover 6*c*. In FIG. 1, the reference numeral 12 designates an earth leakage test button, and the numeral 13 designates knobs of switches for sensitivity current and operation time selection. These parts are installed in a unit case of the earth leakage trip device 1 as described below.

FIGS. 4(*a*) through 4(*d*) are supplementary illustrations of the earth leakage breaker with an earth leakage operation output switch 5 mounted afterwards in the main body housing 1, in which FIG. 4(*a*) shows a state with a top cover 6*c* shown in FIG. 1, FIG. 4(*b*) shows a state that the cover is removed, FIG. 4(*c*) is an enlarged plan view of the region "P" in a state the cover division 6*b*-2 is removed, and FIG. 4(*d*) is a drawing for reference showing a state in which the earth leakage trip device 1 and the earth leakage operation output switch 5 have been removed from the main body housing to empty the recess 6*b*-3 of the case cover 6*b*. In FIGS. 4(*c*) and 4(*d*), the reference numeral 14 designates an earth leakage detection circuit (a printed circuit board) contained in a printed board accommodation portion 11*a* of the unit case 11 described later, and the numeral 15 designates a switching mechanism for a main circuit contact. A U-shaped groove 6*b*-4 is formed at the upper edge of a side wall of the case cover 6*b* for leading out lead wires 18 connected to the earth leakage operation output switch 5 outwardly.

Descriptions will be made on an assembly structure of the earth leakage trip device 1 referring to FIGS. 5 through 8; and on the structure of the earth leakage operation output switch 5 referring to FIGS. 9, 10(*a*) and 10(*b*).

Figure 5:
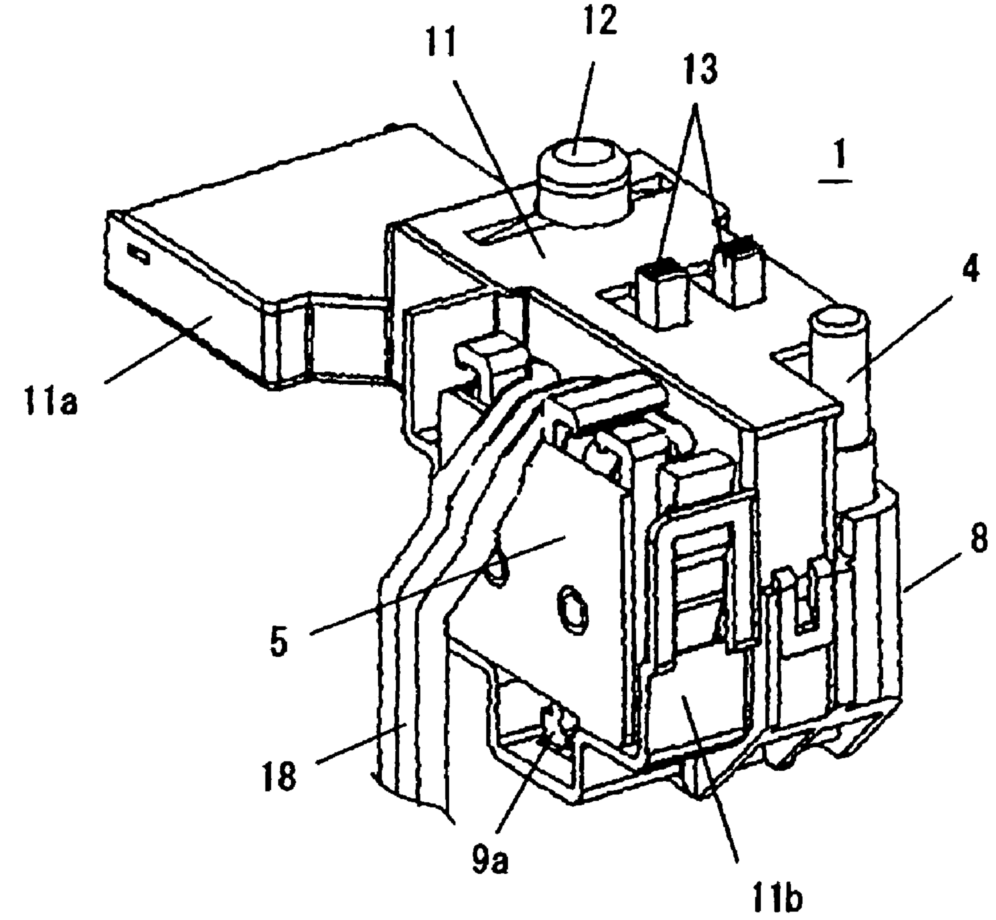
FIG. 5 is a perspective view in which an earth leakage operation output switch is inserted and held in the earth leakage trip device in FIG. 1.
Figure 6:
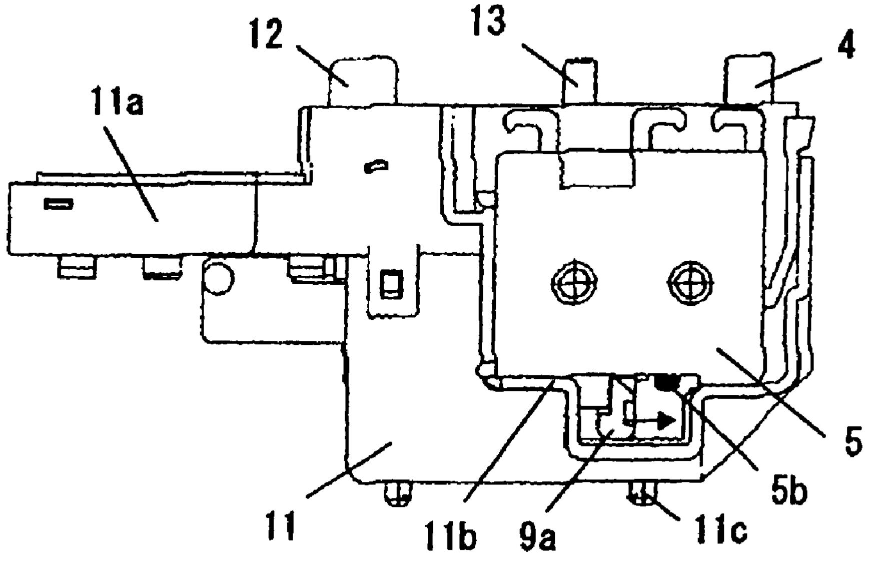
FIG. 6 is a side view of FIG. 5.
Figure 7:
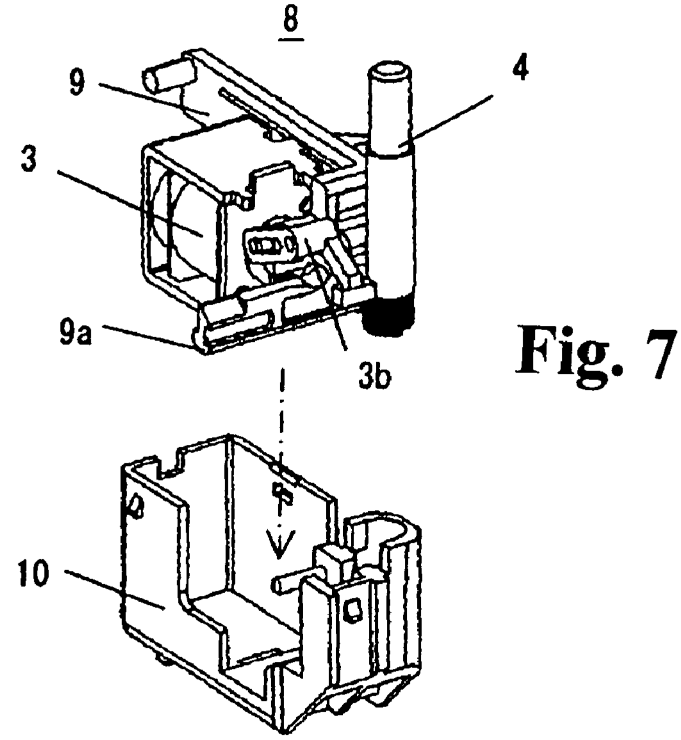
FIG. 7 is a disassembled perspective view of a trip coil unit in FIG. 5.

The earth leakage trip device 1 shown in FIG. 5 and FIG. 6 comprises a unit case 11; components contained in the unit case 11 as a unit including an earth leakage detection circuit 14 (FIG. 4(*c*)), an earth leakage test switch 12, switches 13 for sensitivity current and operation time selection, and an assembly of a trip coil unit 8 shown in FIG. 7; and a switch housing 11*b* for accommodating and holding an earth leakage operation output switch 5 provided on a side surface of the unit case 11.

The trip coil unit 8 is, as shown in FIG. 7, an assembly comprising a case 10; and an earth leakage indication button 4 and a trip actuation slider 9 coupled with a trip coil 3 (a plunger type electromagnet) through a driver lever 3*b* inserted into the case 10. This case 10 is fitted to the unit case 11 of the earth leakage trip device 1 by snap fitting (FIG. 5). In this fitted state, the dog 9*a* for switching operation branched from the side of the actuation slider 9 is projecting to the bottom of the switch housing 11*b* formed on the unit case 11.

The earth leakage operation output switch 5 is a micro-switch including a contact mechanism (c-contact) provided with normally-open and a normally-close contact points. As shown in FIG. 9 and FIGS. 10(*a*) and 10(*b*), a plunger 5*b*, an actuator of the contact mechanism, is projecting from the bottom surface of a switch case (a molded resin case). On the left and right end surfaces, engage projections 5*d* and a hook 5*e* (snap fit) are formed in a monolithic construction. On the top of the micro switch, lead wire supports 5*c* (three pieces) are provided in a form of a bar with a rectangular cross section directing right-wards or left-wards and having an L-shaped bent at the tip. The lead wire supports are retaining members to entangle three lead wires 18 (FIG. 8) that are connected to the internal contacts and lead out to the top surface of the switch case.

Figure 8:
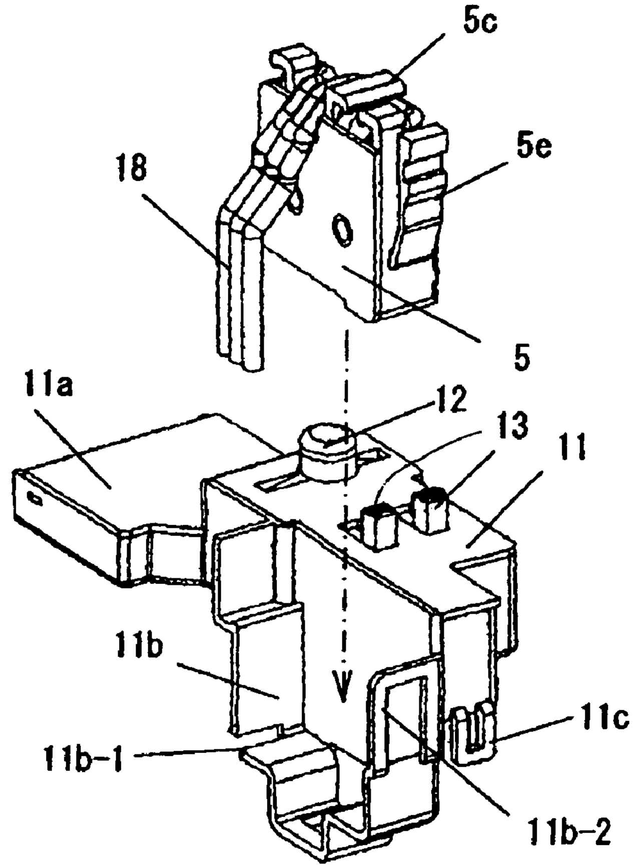
FIG. 8 is a perspective view of the earth leakage trip device of FIG. 5 before mounting an earth leakage operation output switch.

The unit case 11 (a molded resin case) of the earth leakage trip device 1 in FIG. 8 includes a housing 11*a* for a printed circuit board 14 for the earth leakage detection circuit (FIG. 4(*c*)) and the switch housing 11*b* in a pocket shape for removably accommodating and holding the earth leakage operation output switch 5. The housing 11*a* and the switch housing 11*b* are formed in a monolithic construction in the unit case 11. The switch housing 11*b* has a fitting groove 11*b*-1 and snap fit part 11*b*-2 corresponding to the engage projections 5*d* and hook 5*e*, respectively, of the earth leakage operation output switch 5. The numeral 11*c* designates a snap fit member for engaging and holding the case 10 (FIG. 7) of the trip coil unit 8.

In the assembled state having the earth leakage trip device 1 mounted on the main body housing 6 (FIG. 1), the switch housing 11*b* formed on the side surface of the unit case 11 (FIG. 8) faces the recess 6*b*-3 formed in the case cover 6*b*, and projecting from the top surface of the case cover 6*b* are the earth leakage indicating button 4, a push button 12 of the earth leakage test switch, and the knobs 13 of the switches for rated sensitivity current and operation time selection.

When an earth leakage operation output switch 5 is installed afterwards into the earth leakage breaker in the structure as described above, after opening the top cover 6*c* as shown in FIG. 1, the earth leakage operation output switch 5 is inserted from above towards the recess 6*b*-3 of the case cover 6*b* opening outside the earth leakage trip device 1 and pushed down into the switch housing 11*b* of the unit case 11 as shown in FIG. 8, and removably engaged and fixed at a predetermined position. In this held state of the switch, the tip of the dog 9*a* (which is cut tapered) branched from the actuation slider 9 of the trip coil unit 8 (FIG. 7) is located opposing the side of the plunger (actuator) 5*b* of the earth leakage operation output switch (micro switch) 5 as shown in FIG. 6.

In the above described structure, on the event of ground fault in the distribution system, the earth leakage detection circuit 14 detects earth leakage current in the main circuit. The output signal from the earth leakage detection circuit 14 operates the trip coil 3 of the earth leakage tripping device 1 driving the actuation slider 9 to trip the switching mechanism 15 and open the main circuit contacts. At the same time, the dog 9*a* branched from the actuation slider 9 moves to the direction of the arrow in FIG. 6 and pushes the plunger (actuator) 5*b* of the earth leakage operation output switch 5 inwardly. The contact (a "make" contact) of the micro switch turns ON, and an electric signal indicating earth leakage operation is output through the lead wires 18. When electric indication of earth leakage operation is not needed in the system, the earth leakage operation output switch 5 can be removed from the case cover 6*b* of the main body housing 6, and the breaker can be used as a normal (standard specification) earth leakage breaker. In such a case, the earth leakage operation can be seen by pop-up action of the earth leakage indication button 4.

Next, a description will be made on a process, in the state of the earth leakage operation output switch 5 post-mounted on the earth leakage breaker, to arrange the lead wires 18 connected to the switch towards the side or above from the main body housing 6 of the breaker and lead out of the breaker referring to FIG. 11(*a*) through FIG. 15.

Figure 13:
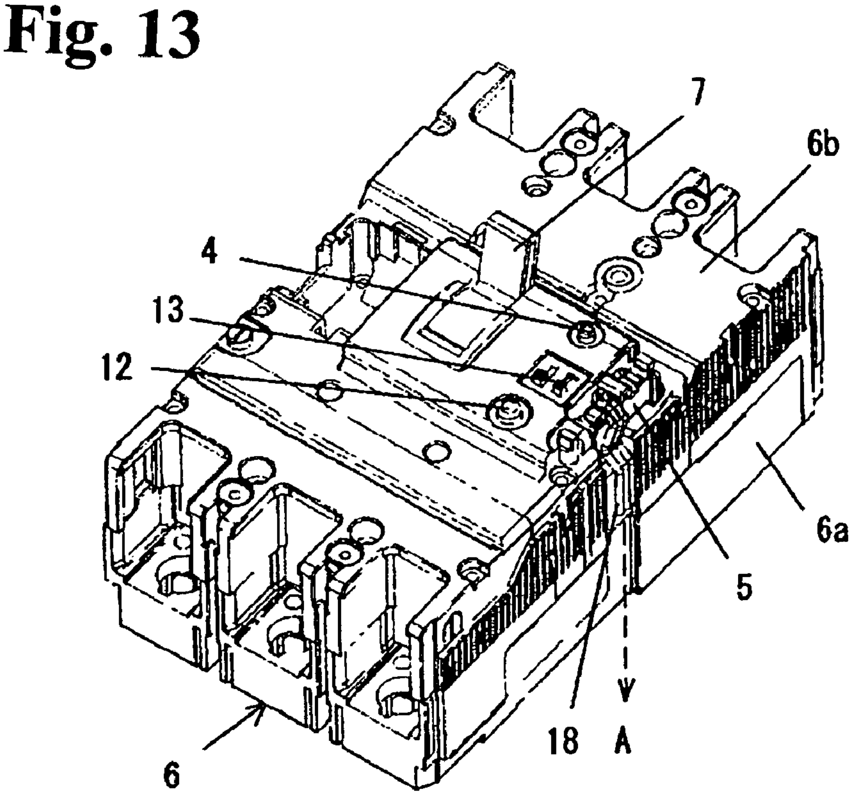
FIG. 13 is a perspective view illustrating the lead wires of the earth leakage operation output switch inserted and set in the case cover of the earth leakage breaker in the arrangement of the wires lead out sidewardly corresponding to FIG. 11.

After the earth leakage operation output switch 5 is inserted and set on the main body housing 5 of the earth leakage breaker, in the case that the lead wires 18 connected to the earth leakage operation output switch 5 are lead out to the side of the main body housing 6 as shown in FIG. 15 (the arrow "A" designates the lead out direction of the lead wires) and externally wired, the three lead wires 18 lead out above the switch are entangled with the lead wire support 5*c* and lined up tightly as shown in FIGS. 11(*a*) and 11(*b*). The lead wires are lead out through a groove 6*b*-4 (FIG. 4(*d*)) formed on the side edge of the cover 6*b* as shown in FIG. 13. When the top cover 6*c* of the main body housing 6 is closed in this state, the lead wires 18 are pressed between the side edge of the case cover 6*b* and the edge of the top cover 6*c* in the intermediate portion of the lead wires and fixedly held at this position. If an external tensional force is exerted on the lead out lead wires 18, there is no risk that the lead wires come off accidentally from the micro switch or the switch itself slips off from the unit case 11 of the earth leakage trip device 1.

Figure 14:
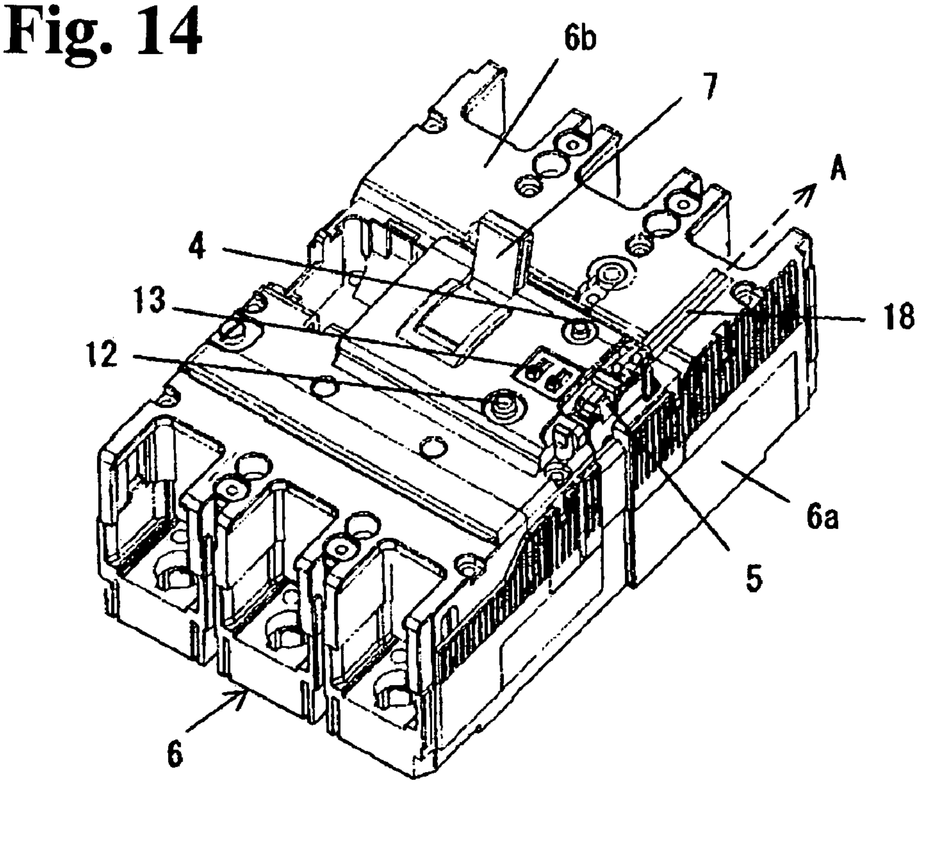
FIG. 14 is a perspective view illustrating the lead wires of the earth leakage operation output switch inserted and set in the case cover of the earth leakage breaker in the arrangement of the wires lead out upwardly corresponding to FIG. 12.

When the lead wires 18 cannot be lead out for wiring sideways as shown in FIG. 15 due to restriction by the surroundings of the installed earth leakage breaker, and the lead wires 18 are to be lead out for wiring towards upward along the surface of the main body housing 6 as in FIG. 14, the three lead wires 18 are entangled with the lead wire support 5*c* and lined up tightly to draw out in the direction of the arrow "A" as shown in FIGS. 12(*a*) and 12(*b*). Then, the top cover 6*c* is put and bound in the same process as the above-described one. Thus, the lead wires 18 drawn out in the direction of the arrow "A" are pressed between the edge of the case cover 6*b* and the edge of the top cover 6*c* in the intermediate portion of the lead wires and fixedly held at this position.

The lead wire supports 5*c* in a form of a bar with a rectangular cross section are provided on the top of the micro switch, and when the lead wires 18 are lead out for wiring from the earth leakage operation output switch 5 post-mounted on the main body housing 6 of the earth leakage breaker, the lead wires 18 can be lead out in a desired direction and held on the main body housing 6 by wiring in the above described process.

The disclosure of Japanese Patent Applications No. 2006-282096 filed on Oct. 17, 2006 and No. 2006-105830 filed on Apr. 7, 2006 are incorporated as a reference.

While the invention has been explained with reference to the specific embodiments of the invention, the explanation is illustrative and the invention is limited only by the appended claims.

What is claimed is:

1. An earth leakage breaker with over current protection and earth leakage protection functions, comprising:

a main body housing having, in a single structure, a casing and a case cover, and an auxiliary cover for covering the case cover, said case cover having a recess for mounting an internal accessory device, components mounted on the main body housing, the components including a main circuit contact, a contact switching mechanism, an operation handle, an overcurrent tripping device, an earth leakage detection circuit combined with a zero-phase current transformer, and an earth leakage trip device, and an earth leakage operation output switch formed as one unit and attachably and detachably mounted in the recess formed in the case cover, the earth leakage operation output switch being the internal accessory device that indicates earth leakage trip operation electrically and linking mechanically with the earth leakage trip device to operate the earth leakage operation output switch in the earth leakage trip operation, wherein said recess of the case cover is located next the earth leakage trip device so that when the earth leakage operation output switch is inserted into the recess, the earth leakage operation output switch mechanically engages the earth leakage trip device, and wherein said earth leakage operation output switch comprises a switch case, a micro switch disposed in the switch case and having a plunger projecting downwardly from the switch case, an engage projection integrally formed with the switch case and projecting from one side thereof, a hook integrally formed with the switch case at a side opposite to the engage projection and projecting outwardly therefrom, and a lead wire support projecting upwardly from the switch case.

2. The earth leakage breaker according to claim 1, wherein said earth leakage trip device has a unit case having a switch housing in a pocket shape for holding the earth leakage operation output switch therein, said switch housing having a fitting groove engaging the engaging projection and a snap fit part engaging the hook.

3. The earth leakage breaker according to claim 2, wherein said earth leakage operation output switch includes a contact mechanism provided with normally-open and a normally-close contact point.

* * * * *